(12) United States Patent
Braund et al.

(10) Patent No.: US 6,284,074 B1
(45) Date of Patent: Sep. 4, 2001

(54) MANUFACTURE OF BONDED ARTICLES (75) Inventors: Robert W Braund, Scarborough; Angus WJ Tennant, Macclesfield; William C Morrison, Kenilworth, all of (GB)

(73) Assignee: G B Tools & Components Exports Limited, Manchester (GB)

( * ) Notice: Subject to any disclaimer, the term of this patent is extended or adjusted under 35 U.S.C. 154(b) by 0 days.

(21) Appl. No.: 09/486,504

(22) PCT Filed: Aug. 21, 1998

(86) PCT No.: PCT/GB98/02524

§ 371 Date: May 19, 2000

§ 102(e) Date: May 19, 2000

(87) PCT Pub. No.: WO99/11449

PCT Pub. Date: Mar. 11, 1999

(30) Foreign Application Priority Data

Aug. 29, 1997 (GB) .................................................. 9718186

(51) Int. Cl.[7] .................................................. B29C 43/18
(52) U.S. Cl. .......................... 156/64; 156/228; 156/307.1; 156/358; 156/583.1
(58) Field of Search .......................... 156/64, 228, 307.1, 156/358, 359, 580, 581, 582, 583.1; 100/50, 315

(56) References Cited

U.S. PATENT DOCUMENTS 3,348,640 * 10/1967 Thompson et al. .................. 188/250
4,081,307 * 3/1978 Morgan, Jr. ........................ 156/272.2
4,452,346 * 6/1984 Stukenborg ....................... 188/250 G

FOREIGN PATENT DOCUMENTS

0751317-A * 1/1997 (EP) .
1593804-A * 7/1981 (GB) .
2278800-A * 12/1994 (GB) .
2308414-A * 6/1997 (GB) .

* cited by examiner

Primary Examiner—James Sells
(74) Attorney, Agent, or Firm—Thomas S. Baker, Jr.

(57) ABSTRACT

A method of manufacturing a bonded friction product, such as an automobile brake shoe, and apparatus therefor, includes forming a plastic inner lining element of uncured or green thermosetting resin binder containing friction modifiers and reinforcements and bonding the element to a shoe platform by way of an adhesive resin in a heat and pressure regime which cures the resin binder and adhesive. The need for a closed mold and/or venting stops is avoided by a stabilizing press (50) which includes a heated bed (53) between guide plates (56, 57) that has a recess (52) of less thickness than the lining element (16) to receive such lining element in its green state. The guide plates are spaced slightly further apart than the width of a shoe platform which is, having been preheated, brought down onto the lining element and pressed by a pneumatic ram (70), the loosely sliding shoe body (11) comprising a non-sealing closure member of the press. The previously heated surface (53) of the press bed and shoe platform (12) combine with the lightly ramped-up pressure to create setting-up of the surface resins and fix final dimensions; the ram osition is then clamped to permit internal pressure growth as curing proceeds and gases are vented without disrupting the sealed major surfaces.

24 Claims, 3 Drawing Sheets

MANUFACTURE OF BONDED ARTICLES

This invention relates to the manufacture of bonded articles and in particular to the manufacture of friction elements in which one major face of a friction lining is bonded to a platform of a carrier by a cured thermosetting resin adhesive system.

Friction elements in which the friction lining is adhesively bonded to a platform of shoe a body are employed inter alia as brake shoes for dynamic (service) brakes and static (parking) brakes for light vehicles such as automobiles and vans and static brakes for heavier commercial vehicles, and are distinguished from friction elements in which the lining is secured to the platform principally by mechanically location with interlocking parts, such as rivets, clips, plugs and the like.

The invention is particularly applicable to friction elements comprising brake shoes of the cylindrically curved drum type wherein the carrier comprises a shoe body having a structure comprising a cylindrically curved platform, on which a correspondingly curved friction lining is carried, and a transverse supporting web.

It is, however, also applicable to friction elements comprising brake shoes of the generally flat disc type and to friction elements of similar types used within a clutch arrangement. Accordingly, although in this specification the term shoe body is used principally to describe a carrier structure having a cylindrically curved platform, within its general sense is also intended to include a structure having a substantially flat platform or backplate on which a corresponding flat friction lining is carried for engagement by a flat surface of a disc or the like.

The principal differences between flat and arcuate friction elements in terms of production are that the former are more readily produced by a moulding process in which the friction material (consisting essentially of fibrous and/or filamentary reinforcement and friction modifying materials in a matrix of a thermosetting resin copolymer as a binder) is dry, that is, the uncured thermosetting copolymer is in powder or particulate form, enabling it to be readily disposed into, and uniformly compacted in, a mould cavity to which a mould closing force is applied unidirectionally. It will be appreciated that it is less easy to compact a powder into an arcuate form of lining element because of the varying angles at which a unidirectional force is applied.

It has therefore been more usual in the art to provide friction lining material with a liquid form of thermosetting resin as a binder to achieve a plastic consistency that can be pre-compacted to an acceptable extent by rolling. Although such a rolled plastic consistency is suitable for producing preforms or lining element which are arcuate prior to curing and setting-up of the thermosetting binder, there is no technical reason why such plastic form of friction lining element should not take a flat form and be bonded to a flat carrier platform.

This specification is concerned with a bonded friction elements in which the lining comprises a preformed plastic lining element of fibrous reinforcement and friction modifying materials in a matrix of uncured liquid based thermosetting resin binder, that is, a green lining element, in which the thermosetting resin binder is cured to form the lining contemporaneously with curing of the thermosetting adhesive system to effect bonding to the carrier platform.

Such combined curing and bonding per se is described in patent specification GB 2278800 in a form which can take advantage of existing bonding equipment, curing facilities and procedures typically available to a manufacturer of brake shoes, and the disclosure thereof, including that in relation to other prior manufacturing methods, is incorporated herein by reference. However, when a manufacturer does not have such existing equipment to employ and/or when it is desirable to improve upon the article throughput rate for individual apparatus, that is, operation cycle time and/or simultaneous manufacture of parts, the combined curing and bonding method known therefrom may not be optimal.

Although the aforementioned specification is concerned with such friction lining in which the adhesive bonding is the sole means of resisting motion between the lining and carrier platform, it is known to combine adhesive bonding with some degree of mechanical interlocking achieved by co-operating projections and recesses of the lining and carrier as additional resistance to shear forces.

Thus, preserving the generality of the foregoing as to the form of carrier, it is an object of the present invention to provide a method of manufacturing more quickly and with less tooling than hitherto a friction element that includes a carrier having a thermoset friction lining, bonded to the carrier by thermosetting adhesive bonding with contemporaneous setting thereof. It is also an object of the present invention to provide an arrangement for manufacturing a bonded friction element more quickly and simply than hitherto.

According to a first aspect of the present invention, a method of manufacturing a bonded friction element comprises (1) producing a plastic friction lining element, including fibrous reinforcement and friction modifying materials in a matrix of an uncured thermosetting resin binder disposed between opposite major faces defining its thickness, (2) disposing one of the two major faces of the lining element adjacent a platform of a carrier with a thermosetting resin adhesive system between, and in contact with, the element and the platform, and (3) curing the resins of both adhesive system and lining element by cross-linking at elevated temperature to a degree of cure whereby the element forms a lining bonded to the platform, the method being characterised by (4) preparing the surface of the carrier platform to receive said thermosetting adhesive system, (5) preheating the carrier to a platform temperature in excess of that required to initiate crosslinking of said adhesive system,(6) sandwiching the lining element and adhesive system between the pre-heated platform and a bed of a stabilising press preheated to a temperature in excess of that required to cross-link the lining element binder and adhesive system, said bed being shaped to conform substantially to the platform and further recessed to receive within said recess the lining element with the opposite major face bearing against the floor thereof, (7) applying to the sandwiched element and adhesive system by way of the platform and bed a consolidating pressure increasing over a predetermined consolidating interval from substantially zero to a predetermined level, permitting plastic flow of the adhesive system and element into conformity with the platform and recess but without significant extrusion before onset of cross-linking of the thermosetting resins, and thereafter maintaining the separation between platform and bed achieved at the end of the consolidating interval for a setting-up interval to permit cross-linking adjacent the heated surfaces to define a stably bonded intermediate product including a partially cured, dimensionally stabilised lining element having substantially the final dimensions and density of the lining, (8) removing the bonded intermediate product from the stabilising press and (9) baking the intermediate product unconstrained at a predetermined baking temperature and for a baking interval to effect further curing of the thermosetting resin of the dimensionally defined lining element to a predetermined level of hardness and strength.

According to a second aspect of the present invention an arrangement for producing a bonded friction element, of the type having one major face of a thermoset friction lining secured to a platform of a carrier by a thermosetting adhesive system, comprises a) formulating means, operable to produce a green paste friction lining element, comprising fibrous reinforcement and friction modifying materials in a matrix of uncured thermosetting resin binder between said one major face of the element and an opposite major face defining its thickness, of lesser density and major face dimensions than required of the final lining, b) platform preheating means operable to heat a said carrier to a temperature in excess of that required to initiate crosslinking of the resin binder of the element and the adhesive system, c) a stabilising press including 1) a bed, shaped to conform substantially to the carrier platform, containing a recess dimensioned to receive therein said green plastic lining element with said opposite major face thereof against the floor of the recess and said one major face thereof without the recess, 2) heating means, operable to heat the bed to provide a recess floor temperature above the cross-linking temperature of the lining element binder, 3) a non-sealing closure member operably defined by a said heated cater, 4) guidance means extending away from the bed and operable to support said closure member overlying the recess and effect guidance between the closure member and the recess in a direction towards and away from the recess, 5) ram means, having relatively displaceable parts fixed and movable respectively with respect to the bed, operable to drive the closure member and bed towards each other, 6) locking means operable to retain the closure member in position with respect to the bed, and 7) control means operable (i) to cause the ram means to move the closure member to sandwich the green plastic friction lining element and adhesive system between the closure member and the recess floor, (ii) to cause the ram means to apply a force between the closure member and bed increasing between predetermined levels in a predetermined consolidating interval, sufficient to force the incompletely cross-linked materials of the adhesive system and lining element into conformity with the platform and recess without significant extrusion of unconfined materials, prior to significant cross-linking of the thermosetting resins thereof due to heat and pressure applied to their surface regions, (iii) to initiate operation of the locking means to lock the closure member in position with respect to the bed at the end of said consolidating interval for a setting-up interval in which said surface regions achieve by continued cross-linking structural strength in excess of internally generated forces resulting from subsequent cross-linking and heating, and (iv) to initiate release of the locking means at the end of said setting-up interval to permit the bonded intermediate product of platform and partially cured friction lining element to be removed from the press, and d) oven means operable to receive said bonded intermediate product unconfined at a predetermined baking temperature for a predetermined baking interval to effect additional cross-linking of the thermosetting components thereof to cure the friction lining and adhesive bond to a predefined condition of hardness and physical strength.

Embodiments of the invention will now be described by way of example with reference to the accompanying drawings, in which.

Figure 1:
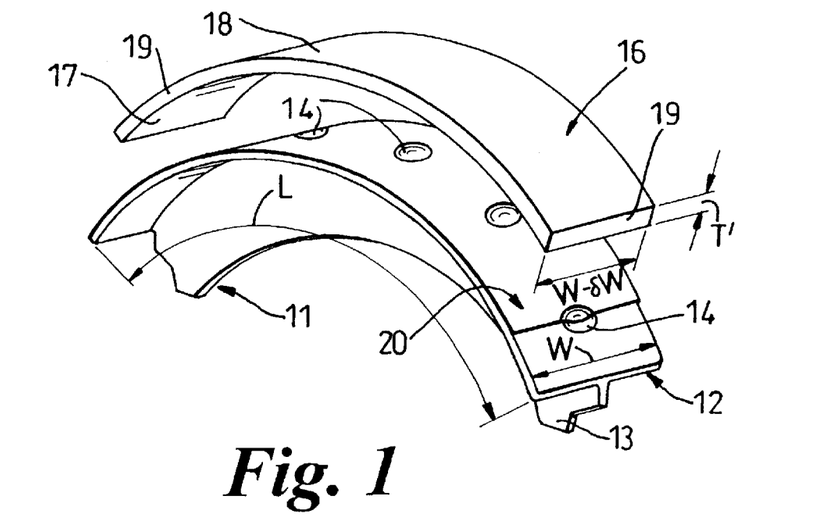
FIG. 1 is a perspective view of components employed in relation to a bonded friction element in accordance with the invention, in the form of a brake shoe illustrating relative dimensions and juxtapositions of a carrier comprising a shoe body having a cylindrically curved platform and green lining element.

Referring to FIG. 1, the component parts of a friction element in the form of a bonded brake shoe of the type used in a drum brake are shown. A carrier or shoe body 11 is formed of mild steel and comprises a nominally cylindrically arcuate platform 12, which forms a section of a notional right circular cylinder having an arc length L in the direction of curvature and being substantially flat of width W in a transverse direction parallel to the longitudinal axis of the notional cylinder defining the curvature, and a substantially planar bracing web 13, and by way of which web brake activation forces are applied to press the platform which extends perpendicularly to the platform as a central spine and to the edge of which web the platform is welded at intervals along its length to define the curvature. In order to preserve a platform surface with no upstanding projections at said welding points, or other features, the platform surface is interspersed with indentations or recesses 14 containing said points or features.

The shoe body is conventional in structure and may conform with conventional variants, such as the platform being divided along its length and assembled from two "half-platforms" welded to the web. Notwithstanding the precise structure, it is typical that the effective flat platform surface is less than the nominal area L×W, such that when employed in a conventional bonded shoe, a bond is not made where such recesses exist unless a thick layer of bonding adhesive fills, but not overfills, such recesses.

In addition to the shoe body the components include a friction lining element 16. The lining element is conventional in including friction modifying materials and reinforcement fibre and/or filaments in a complex copolymer matrix of a thermosetting resin and nitrile rubber as a binder.

The lining element is produced in conventional manner by admixing the ingredients, with the rubber as a fine powder in which the molecular chains have been reduced mechanically so that it is able to combine chemically with the resin binder used in liquid form, to give the binder a handleable plastic consistency and suited to rolling to define a predetermined density D' and dispose the fibrous materials in alignment with major faces 17, 18, bounded by minor faces 19, that define its rolled thickness T'. The rolling also includes a curling, or radius rolling, step whereby the lining element is passed between rollers running at different speeds and assumes a generally cylindrical curvature corresponding approximately to the curvature of the platform.

Depending upon the nature of the thermosetting resin binder, that is, whether or not its curing results in gases within the material, the density D' of the lining element is typically 80%–95% of the density D required of the lining when the resin is cured and the lining bonded to the shoe platform, that is, $D'=(D-dD)$. As is common in the art, the density required of the final lining is less than the theoretical maximum density, typically of the order of 95%, so that the rolled material may have a density of 75%–90% of being fully densified.

Likewise, the rolled thickness T' at this lower density is correspondingly greater than the desired final thickness T to allow the change in volume by way of only minor changes in length and width and to produce said change dD in density principally by way of a reduction in thickness, that is, $T'=(T+dT)$.

The lining element may be rolled to thickness and curvature as an individual lining or may, be produced as a large sheet from which each element is cut with appropriate dimensions of length and width and to this end, and in accordance with traditional practice, the reinforced fibres are aligned generally in a direction that follows the flow of material in rolling, that is, lengthwise in each element.

However, whereas traditionally the lining element would be heated with pressure applied to the major faces to fully cure the resin binder into an essentially rigid liner (or more usually a curved sheet from which individual linings are then cut to final size of length L and width W to fit the platform) and the major surfaces machined to appropriate dimensions and surface finish prior to bonding to the shoe platform, in accordance with the present invention the lining element 16 is employed in its plastic, so-called green state and prior to any significant cross-linking of the thermosetting resin components.

The final component of FIG. 1 is a bonding adhesive system indicated generally at 20, in the form of one or more layers of a phenolic or other thermosetting resin-based material conventionally used in manufacturing bonded brake shoes, interposed between one major face 17 of the lining element and the shoe platform 12.

Figure 2:
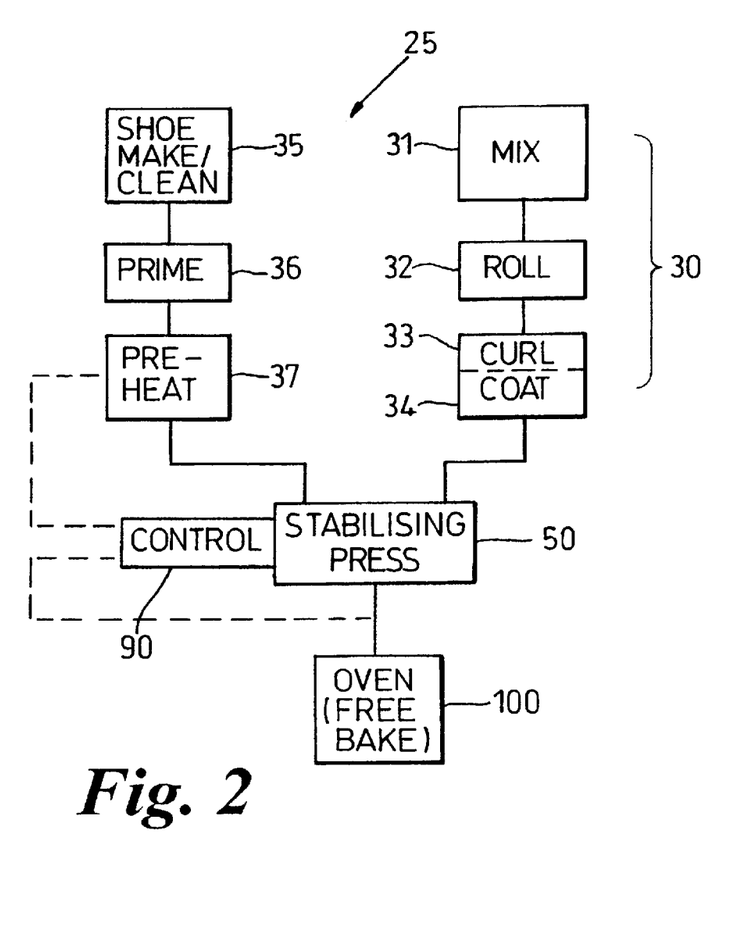
FIG. 2 is a flow chart showing schematically the operational steps in manufacturing an arcuate brake shoe in accordance with the present invention and indicating the apparatus for performing specific operations, including shoe preheating means, a stabilising press for producing a partially cured, bonded intermediate product and oven means for baking the bonded intermediate product to complete curing unconstrained.

Manufacture of a bonded brake shoe from the above described components in accordance with the present invention will now be described with reference to FIGS. 2 to 5. FIG. 2 is a flow chart indicating both the processes or operational steps that form a particular manufacture of a brake shoe having dimensions typical of those for the dynamic, or service, braking of a medium-sized (less than 1 tonne) passenger automobile or van, rather than a commercial vehicle or truck. However, insofar as it is known to employ brake shoes of such dimension in combination with other components to effect purely static, or parking, brake requirements for such heavier commercial vehicles (often comprising so called drum-in-hat structures), it is appropriate to refer hereafter to such a brake shoe by its approximate dimensions rather than precise appear of use, that is, as 'automobile-sized', notwithstanding possible incorporation in much heavier braking systems.

Referring to FIG. 2, an arrangement 25 for the manufacture of a bonded brake shoe is represented schematically by a flow chart indicating both the processes or operational steps that form the manufacture. A friction material as described above is, in formulating means (30) by admixing (31) the above described ingredients, with the rubber as a fine powder in which the molecular chains have been reduced mechanically so that it is able to combine chemically with the resin used in liquid form, to give the binder a handleable plastic consistency and suited to rolling (32) substantially at ambient temperature to define with the friction modifying and reinforcement ingredients a plastic, and so-called green, slab or sheet of friction lining material having both optimum orientation of fibrous components and predetermined properties of thickness T' and density D'. The slab, after cutting into individual elements dimensioned for each shoe and after, or simultaneously with, passage through a curling or radius rolling mill (33), has the concave major face 17 thereof coated (34) with a main component of the thermosetting resin adhesive system 20, preferably phenolic resin compound, such as the adhesive type PL605-35 supplied by Sovereign Engineered Adhesives LLC, Akron, Ohio, USA.

The platform 12 of shoe 11 is prepared conveniently at shoe manufacture, by mechanically and/or chemically cleaning (35), and coated (36) with another component of the adhesive system 20, in the form of a relatively thin primer layer of phenolic resin compound compatible with the main adhesive component, such as type IR 1947 supplied by Hepworth Minerals and Chemicals West Bromwich, England, as a shoe-coat or primer material. The primer layer is typically applied at or above ambient temperature and dried to touch without cross-linking occurring within the resin.

For the manufacture of a bonded brake shoe, the shoe body, including the primer-coated platform 11, is raised in temperature to one in excess of that necessary to initiate cross-linking in the element and adhesive system, being subjected to a pre-heating operation in pre-heating means comprising an oven (37) for a time which, notwithstanding the initiation of cross-linking of the primer component of the adhesive system, is insufficient to effect complete croslinking but sufficient to raise the temperature of the bulk of the shoe body. The above-mentioned primer component of the adhesive system typically has cross-linking initiated at a temperature of about 180° C.; it is found suitable for this size of shoe body for the oven to operate at a temperature of 200° C. to 210° C. and the shoe body (initially at ambient temperature) to be soaked therein for a period of 2–14 minutes and typically 7–9 minutes.

The pre-heated shoe body is transferred with minimum delay, that is before complete cross-linking of the primer occurs or the shoe body cools significantly, to a stabilising press (50) where it forms a closure member that (under the influence of a controlled ram means described below) sandwiches between the shoe platform and a heated bed of the press the adhesive-coated lining element 16.

The lining element is disposed in the heated press immediately before the shoe body such that the adhesive layer is abutted by the primer-coated platform and, as more fully described below, a sandwiching-pressure time regime is established which results, within a short interval typically less than one minute, in the thermosetting resins of the lining element and adhesive system achieving sufficient degree of cross-linking individually and to each other to give a dimensionally stabilised, partially cured, bonded intermediate product that can be removed from the stabilising press and subjected unconfined to continued elevated temperature by so called free-baking in oven means (100). The oven means is held at a temperature in the range 240–300° C. and each intermediate product is disposed therein for about 40 minutes to achieve a degree of friction material curing typically required for a friction lining of a brake to give it the properties of hardness and mechanical strength required.

It will be appreciated that the techniques and apparatus employed in the steps (31)–(34) with regard to the lining element and (35) and (36) with regard to the shoe are, with the exception of the choice (and time of application) of the components of the adhesive system, substantially conventional per se and do not require describing or illustrating in greater detail.

Figure 3A:
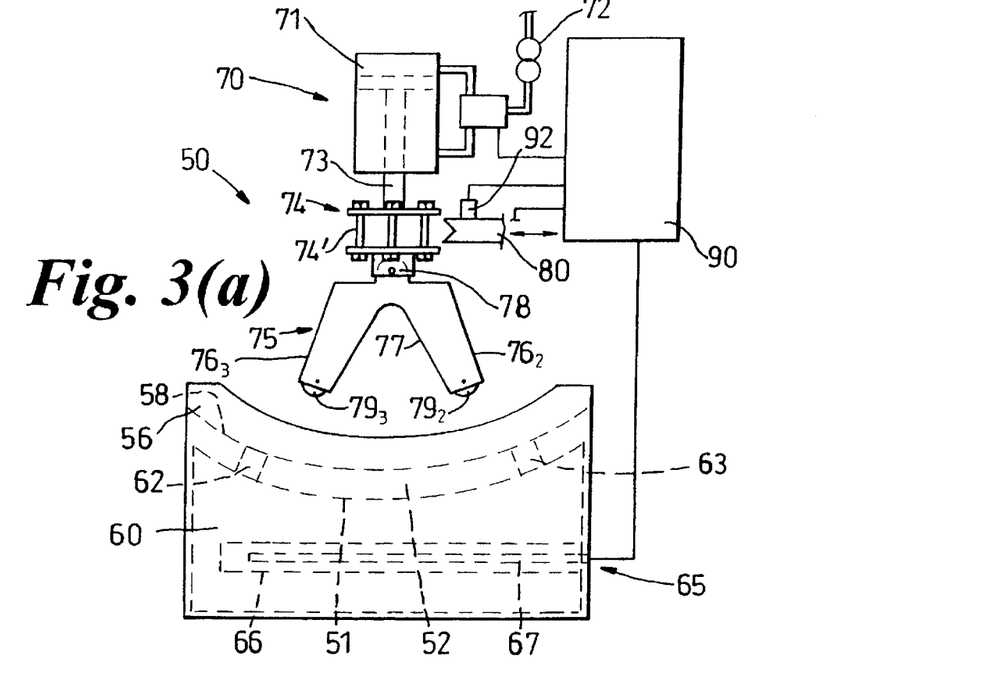
FIG. 3(a) is a sectional elevation through the stabilising press indicated in FIG. 2, showing a recessed heated bed dimensioned and profiled to receive a green, arcuate lining element and a closure member comprising a pre-heated shoe body platform, ram means to apply sandwiching pressure to the element by way of the shoe body and control means to monitor and control the level and duration of pressure to provide a dimensionally stable, partially cured, bonded intermediate product.
Figure 3B:
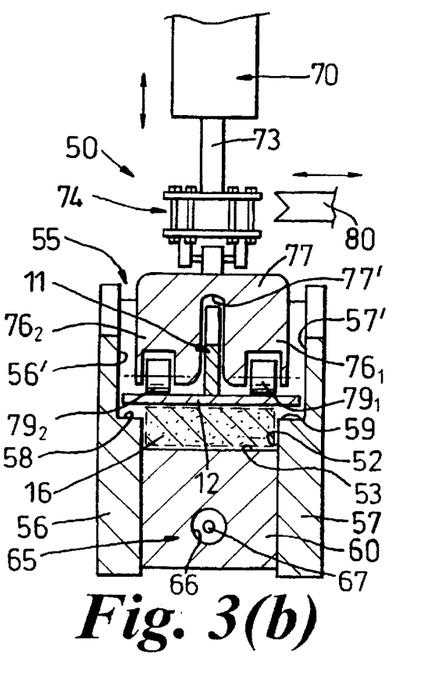
FIG. 3(b) is a sectional elevation through the stabilising press taken at right angles to FIG. 3(a), illustrating in ghosted form the presence of a green lining element and shoe body therein prior to sandwiching by the shoe platform.

Referring to FIGS. 3(*a*) and 3(*b*), the stabilising press 50 associated with that operation step is dimensioned and shaped to produce a brake having the arcuate platform 12 of FIG. 1. The press comprises a bed 51 shaped to conform substantially to the carrier platform, that is, part cylindrical, containing a recess 52 dimensioned to receive therein a green, plastic arcuate lining element 16 with its convex major face 18 bearing against the floor 53 of the recess. The depth of the recess is not greater than the thickness required of the cured lining, and preferably less, such that the other major face 17 of the lining element coated with the adhesive remains without the recess as shown ghosted in FIG. 3(*a*).

The bed of the stabilising press also has associated therewith guidance means indicated generally at 55 extending away from the bed and operable to support a non-sealing member, defined by the pre-heated carrier 11 as shown in FIG. 3(*b*), overlying said recess and effect guidance between the closure member and recess in a direction towards and away from said recess.

Structurally, the stabilising press 50 comprises a pair of spaced metal guidance plates 56, 57 spaced apart by the width of the shoe platform 12 such that it can slide between the facing surfaces 56' and 57' respectively thereof which define the guidance means 55. The plate 56 has a shoulder 58 extending from said facing surface 56' towards the facing plate 57 and likewise the plate 57 has a corresponding shoulder 59. The shoulders define the bed 51 of the press surrounding the recess 52, and are separated by a metal spacing block 60 which defines, and provides the floor 53 of, the recess 52.

The shoulders 58 and 59 are arcuate and correspond to the part-cylindrical curvature of the shoe platform that is specified for the bed of the press, as does the surface of the metal spacing block 60. The block further comprises raised portions 62, 63 spaced apart in a direction parallel to the planes of the guidance plates and defining the ends of the recess 52 substantially coplanar with the shoulders 58 and 59.

Heating means, indicated generally at 65, comprises one or more apertures 66 extending into block 60 and/or the guidance plates, into each of which aperture is inserted a heating element 67 to supply heat to recess floor 53 and maintain it at a temperature above that at which cross-linking of the element binder is initiated. Typically a temperature in the range 210°–250° C. is sought, depending upon the precise thermosetting properties of the materials.

The edges of the guidance plates remote from the shoulders that define the press bed are conveniently also arcuate to facilitate disposing a shoe body between the plates with its platform directed towards the bed.

The recess 52 in the bed is dimensioned, in terms of length and width (but not thickness as described above) to correspond to the length and width dimensions required of the cured lining and the green element is produced having somewhat smaller length and width dimensions to permit ready placement in the recess.

The press 50 also includes ram means, indicated generally at 70, having parts displaceable relative to each other and fixed and movable respectively with respect to the bed 51. The ram means is operable to drive the closure member, that is, platform 12 of shoe body 11, towards, and possibly away from, the bed of the press. Conveniently the ram means comprises a simple, reciprocable pneumatic piston and cylinder arrangement 71 and a source 72 of pressurised gas for the cylinder, to displace the piston with respect thereto, which is able to exert a limited pressure only on the shoe platform such pressure being low for a manufacture in this art, in the range 35 to 150 kN/m$^2$ (5–21.75 psi) and typically below 100 kN/m$^2$ (14.5 psi).

The movable part of the ram means indicated by a piston rod 73 preferably includes thermal barrier means 74 which functions to limit the conduction of heat away from the pre-heated shoe, which not only permits the shoe to remain at a higher temperature but also inhibits any undesirable effects of heating the gas in the pneumatic cylinder with any pressure variation consequent thereon. The thermal barrier means, as illustrated, is provided by an air gap between sections of the piston rod joined by a plurality of small-sectioned, poorly-conductive tie bars 74'.

The ram means further includes a ram interface 75 comprising a plurality of articulated contact members defined by a spider-like member 77 having a plurality of relatively fixed and mutually divergent limbs 76$_1$, 76$_2$ . . . pivotally coupled to the movable ram part at 78. Each limb terminates in a roller 79$_1$, 79$_2$ . . . operable to bear against the reverse, concave face 12' of the platform 12 so that the reciprocable ram means exerts a force directly on the platform, substantially uniformly at the plurality of spaced locations contacted by the rollers, whilst accommodating in slot 77' the web 13 of the upturned shoe comprising the closure member.

Locking means, indicated schematically at 80 is operable to retain the closure member (platform) in position with respect to the bed when required and notwithstanding the level of any reaction or back pressure exerted on the ram means by the closure member. Conveniently, the locking means can co-operate with the thermal barrier means, any surface feature of the piston rod or simply clamp against the rod.

The stabilising press includes control means 90 which controls and co-ordinates many of the integers of the press described above such that it operates in accordance with a predetermined regime to produce the above-mentioned dimensionally stabilised, partially cured, bonded intermediate product.

The control means 90 is coupled to provide instruction signals to, and receive monitoring signals from, the ram means and locking means, in particular monitoring the reaction pressure imposed upon the locking means by pressure within the lining element. The control means may also, for convenience, control the heating means and, possibly, the shoe platform preheating means 37 and baking oven 100.

Figure 3C:
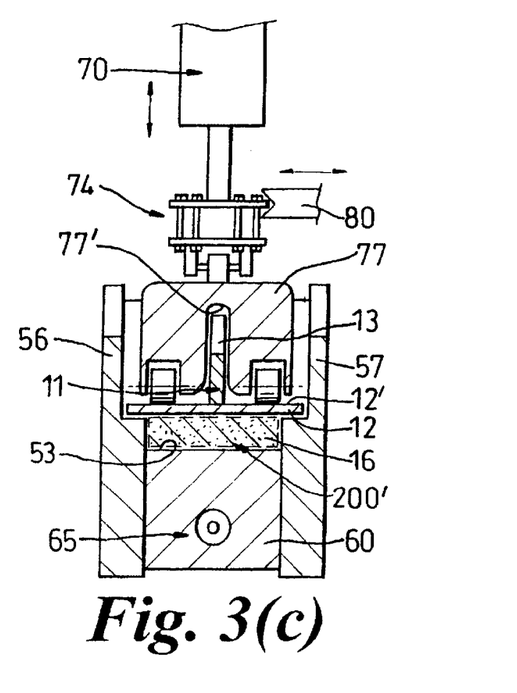
FIG. 3(c) is a sectional elevation, similar to FIG. 3(b) but showing the relative positions of shoe platform and bed of the press after application of sandwiching pressure and illustrating somewhat exaggerated, the unsealed nature of the element confinement by the stabilising press.

Considering operation of the stabilising press in producing a bonded intermediate product, and making reference also to FIG. 3(c), the bed of the press is heated by the heating means 65 to maintain the bed at a temperature controlled by the control means. A shoe body 11 is preheated in oven 37, as described above, and, just prior to the shoe body being removed from the preheating oven, the recess 52 in the bed 51 of the press is treated with a mould release agent (if it does not have a permanent non-stick coating) and the aforementioned arcuately shaped and adhesive-coated lining element 16 is disposed manually or by machine in the recess with the adhesive-coated concave major face towards the ram means and lying, because of the element thickness, above the level of the bed and within the guide means.

The pre-heated shoe body is disposed between the guide plates 56, 57 with the platform facing the lining element and permitted to rest thereon, substantially as shown in FIG. 3(b). At this time the lining element is, by way of its major faces 17 and 18 and to some extent the minor faces 19, in receipt of heat transferred from the press bed and platform into at least the surface regions and becomes, at said regions, relatively fluid Of mobile.

The ram means is actuated by the control means such that the ram interface bears against the shoe body and exerts thereon a vertically directed force that is manifested as a sandwiching pressure on the lining element which is increased from the initial, substantially zero, pressure for a predetermined consolidating interval to reach a predetermined, but still relatively low, level. The instantaneous pressure level effects plastic flow of the adhesive system and element into conformity with the platform 12 and recess 52 and consolidating its form but, bearing in mind that the element is not fully enclosed, avoids any significant extrusion of the lining material from the recess or at that part without the recess before the onset of cross-linking. Such consolidating of the more fluid material under pressure has an effect of reducing its thickness somewhat, for example, collapsing voids of trapped air or other gasses resulting from the mixing and rolling of the ingredients that form the element and evaporation of volatile solvents.

After an initial heat-absorbing period in which the resins achieve this fluidity and any readily volatile constituents may form as vapour, cross-linking begins to occur which results in evolution of further gases and vapours within the matrix of the lining, all of which are capable of leaving the element by way of the incompletely confined minor faces and between the carrier and guidance plates and assisted from the element by the increasing sandwiching pressure.

For this 'automobile-sized' brake shoe it has been found that increasing the pressure over a consolidating interval of approximately 4–6 seconds to a level within the range of 35–120 kN/m$^2$ (5–17.4 psi) is suitable.

Furthermore, after the few seconds that represents the consolidating interval the cross-linking of the thermosetting resin binder at the surface regions of the element in receipt of heat from the bed and platform, is sufficiently advanced that most of the initially present and evolved gases and vapours have been forced out as setting-up, that is, loss of plasticity in the binder, commences and the dimensions of the element are those applicable to the fully cured lining, as substantially is the density, and notwithstanding that the bulk of the lining material has not achieved such level of cross-linking and is still to undergo such process with the possibility of attendant gas and vapour evolution.

At the end of the aforementioned and predetermined consolidating interval, the control means actuates the locking means 80 which maintains the separation achieved between the platform and press bed for a further, setting-up, interval to permit cross-linking and setting-up to extend progressively further within the bulk of the material. Notwithstanding that internal pressures are generated within the lining material by gases evolving during said cross-linking, which internal pressures react against the locking means, these gases are permitted to escape the unconfined boundaries whilst the locking means prevents the relatively fragile solidified major surface regions from being ruptured by these additional, but relatively short-lived, internal forces, and notwithstanding their imposing an effectively increased reaction pressure on the ram means.

A setting-up interval suitable for a friction lining element of the above-mentioned dimensions is typically in the range 40–60 seconds and at the end of this setting-up period, the level of reaction subsides significantly so that notwithstanding the incomplete level of cross-linking within the resin binder, the lining element can be removed from constraint and remain dimensionally stable. This consolidating and setting-up interval is also sufficient for the component parts of the adhesive systems to cross-link with each other and with the resin binder of the lining element face adjacent the preheated platform to the extent that a stable bond is formed between the platform and the lining element.

The control means monitors the pressure exerted by the lining element on the ram means and locking means throughout the consolidating and setting-up intervals; during the consolidating interval the pressure exerted by the ram is a measure of this and during the setting-up interval, the force exerted on the locking means by the element pressure is measured by load cell means 92, or the like. Such load cell means may be incorporated into the thermal barrier means of the ram means and/or the locking means.

It will be appreciated that effecting a rapid setting-up and partial cure that results in a dimensionally stable bonded intermediate component is subject to a number of variables, such as lining material composition, dimensions, bed and platform temperatures, applied consolidating pressure and rate of application.

It is found most practicable to undertake, for a particular friction lining material composition and final lining size, experimental operation with various temperatures, consolidating pressure rate and interval and setting-up interval parameters which results in a bonded intermediate product having the correct dimensions and density, that is, known to result in friction lining having the desired physical properties. Thereafter the temperature, sandwiching pressure and time intervals are stored in the control means, or means coupled thereto, the reaction pressures from the lining element are monitored as a function of time throughout the consolidation and setting-up intervals, reproducing the manufacture, and the monitored and stored parameters compared, it being possible to determine with a considerable degree of certainty that the bonded intermediate product is satisfactory or not, that is, is to be accepted by the oven means or declared a reject.

Most practicably, the temperature and pressures parameters are monitored by sampling at intervals and, if necessary, any parameter values at intermediate times interpolated from these. The values obtained at, or interpolated from, the sampling times are compared with the stored acceptable values for corresponding points of the process against a predetermined and relatively small threshold of discrepancy, whereby if only a few samples depart from the stored parameters without showing a trend, that is, there is overall conformity, the intermediate product is not rejected. Alternatively or additionally, each value of temperature and/or pressure monitored at a sampling time may be compared with stored acceptable values for a corresponding point of the process and any discrepancy in excess of a predetermined and relatively large threshold result in instant rejection; clearly these different forms of comparisons may be applied together. Furthermore such comparisons may follow different criteria and the parameters may be monitored on a continuous basis rather than by sampling.

At the end of the setting-up interval, the control means releases the locking means and the ram means is retracted away from the shoe body and the now-bonded intermediate product, unheated generally at 200', is lifted from the bed of the press by way of the guidance plates and depending upon the result of the monitoring and comparisons undertaken by the control means, at least an indication is given whether or not the product is suited to be passed to the further free-baking operation or rejected.

The heated press bed is treated with a suitable mould release agent, if necessary, and the cycle is repeated of disposing a green adhesive-coated lining element in the recess and placing a preheated shoe platform thereon before applying sandwiching pressure.

Although the shoe is in poor thermal contact with the heated press bed and tends to lose heat, in part to the lining element, during the consolidating and setting-up intervals, the intermediate product emerges from the press at a significantly elevated temperature, typically in excess of 100° C., unsuited to any operation requiring it to be handled manually without cooling. However, because the lining element and bond requires no further constraint, the still-heated intermediate product is placed in oven means 100 maintained at a temperature that is conventional for final curing of friction lining material based on thermosetting resin binders, in the range 240–300° C. The comparatively low thermal mass of the bonded intermediate product, absent any additional constraint means, and its initially elevated temperature enables it to absorb heat quickly and continue curing of the thermosetting resins of the lining element and, adhesive bond. Each intermediate product is, as a consequence, held within the baking oven for a relatively short time interval of 20–40 minutes in order to achieve the additional degree of resin curing for the desired degree of hardness and mechanical strength required of both lining element and adhesive system for use as a brake shoe in a vehicle wheel. Clearly the degree of final curing by which desired physical properties can be achieved is open to variation by changing the precise duration and/or temperature of free baking in the oven means. The oven means is shown schematically in FIG. 4, being a continuous oven having a curtained inlet region 101, to receive each bonded intermediate product 200' as it is removed from the stabilising press, and transport means 102, in the form of a continuous conveyor belt on which the products are supported, operable to transport each product through the oven in a predetermined time interval and discharge it therefrom at a curtained outlet region 103. An alternative transport means (not shown) is an overhead track or the like from which each product is suspended.

Figure 4:
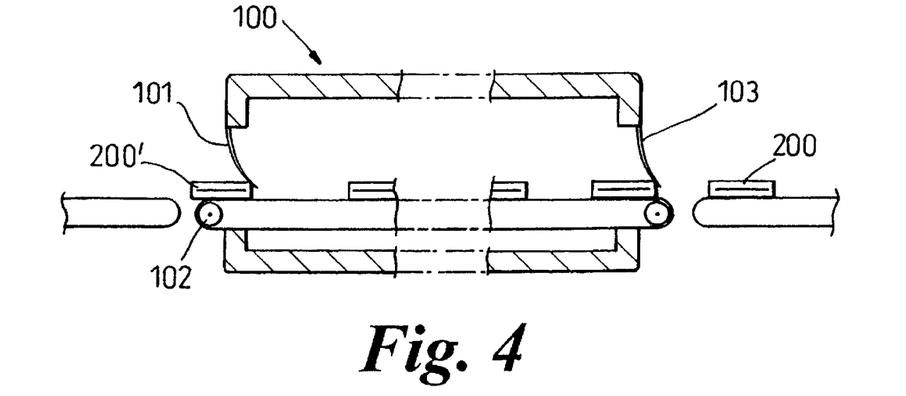
FIG. 4 is a schematic sectional elevation of continuous oven means for baking the bonded intermediate product to a further degree of cure in an unconstrained form and on a continuous basis.
Figure 5:
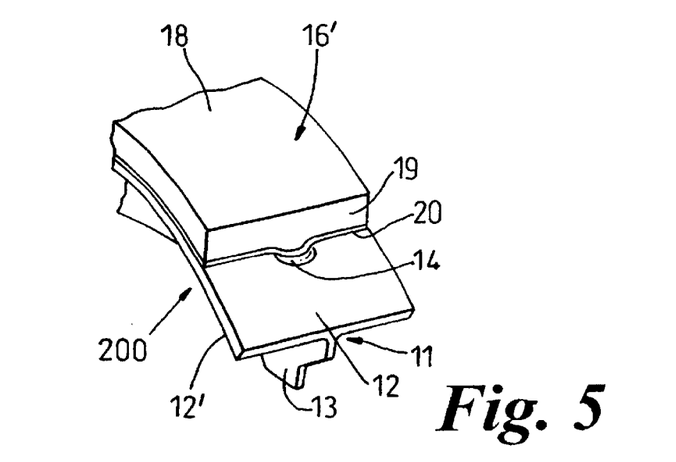
FIG. 5 is a partly cut-away perspective view showing a bonded brake shoe in accordance with the invention.

A finished friction element, in the form of such a brake shoe, is shown at 200 in FIG. 4 at the outlet region of the oven means and in FIG. 5 with the lining 16' partially cut away to illustrate how the bonding is in conformity with the shoe platform. Because of the reproducibility of the monitored pressing/bonding operation the friction element obtained from the baking oven means is substantially of the final dimensions, but as the stabilising press does not operate a precision moulding operation and it may be desirable to dress the friction lining of the shoe 200 by grinding or otherwise machining to a limited extend its exposed surfaces to ensure that at least the major surface 18 has a particular appearance and/or conforms substantially to a circular arc able to bed with a brake drum and having a centre of curvature defined by mounting points of the shoe for this purpose, such dressing technique being the same as practised for brake shoes made traditionally by bonding a pre-cured lining to a shoe platform.

It will be appreciated that to obtain a commercially useful throughput from oven means 100, if the latter is not to have inordinate size and the intermediate products are to be introduced as and when leaving the stabilising press, it is required that a significant number of intermediate products be contained within the oven at any instant. With some forms of transport system, such as an overhead conveyor from which the products hang, the track may follow a meandering path through the oven which the products enter and leave serially. In such a case the each intermediate product released from the press may be directly attached to this transport system, so that the throughput rate of the oven matches that of the stabilising press, subject of course to any rejects.

With other forms of transport system, such as conveyor belt, with which it is less easy to devise other than a direct route through the oven, it may be appropriate to have one or more stabilising presses 50 providing intermediate products at a rate greater than the cycle rate of an individual press as described above. For example, a plurality of stabilising presses may be set up and operated in parallel; this is economically feasible through the use of relatively inexpensive pneumatic ram means and the low sandwiching pressure applied thereby in the consolidation interval and simple configuration of press bed and guidance means.

Alternatively, a plurality of press beds may be movably disposable with respect to single ram means, differing from that described above in that the locking means is arranged to lock the closure member (platform) directly with respect to the guide means, possibly manually, so that the ram can be retracted after the short consolidation interval and the bed moved for the duration of the setting-up interval whilst the ram is employed in applying sandwiching pressure to a replacement bed.

In any of the above described variants the heating means for the press bed may also differ and be located discretely from the body of the stabilising press, for instance within a fixed surface upon which the, or each, press bed stands to receive heat by conduction, or in the form of a pre-heating oven or the like in which the, or each, press bed is heated, such heating means nonetheless being considered a part of the stabilising press.

It will also be appreciated that the pre-heating of the shoe body, and if appropriate press bed, may be achieved other than by soaking in an oven, for example by passing through a high frequency induction coil means. Where such pre-heating is performed by soaking in an oven, the body may be caused to move through the oven (as with oven means 100) on a conveyor so that shoe bodies are supplied continuously, each having spent the appropriate time in the pre-heating oven.

Clearly there are also a number of options available for performing the sandwiching operation throughout consolidating and setting-up intervals. Within the consolidating interval the control means as described may admit gas to the pneumatic ram means such that the load the ram applies to the shoe body increases in any specified manner for the consolidating interval. The load may be caused to increase substantially linearly throughout the internal or follow some other law of continuously increase; it may also respond to back-pressure from within the lining element to modify the load vs. time relationship.

It will be appreciated that the duration of the setting-up interval may be chosen in response to time constraints imposed by other processes such that the cross-linking has not inevitably proceeded to a degree wherein the reaction pressure on the locking means has subsided to a level and for a duration that it is safe to release the locking means from the still-heated lining element and adhesive bond without that sudden drop in pressure being significant in respect of creating pockets of gases and/or vapours in the thermosetting materials. In such circumstances, the control means may be arranged to cause the ram means to apply a sandwiching pressure equal to that monitored from the locking means and, after release of the locking means, ramp down the ram pressure as a function of time.

Alternatively, instead of determining a substantially fixed setting-up interval after which the level of reaction has fallen, the control means may, as a result of monitoring the reaction pressure level, determine for each moulding operation when the level has fallen to a consistently low value to terminate the setting-up interval on that basis.

From the above descriptions it will be appreciated that within certain constraints, usually temperature ranges associated with cross-linking behaviour of the thermosetting resin materials used in making friction lining materials and adhesive systems for bonding them to metal platforms, there is scope for variation of time intervals and some process steps in accordance with the specific materials employed and the physical parameters desired of the finished friction element. However, notwithstanding such minor variations, it will be appreciated that for a friction lining element having the dimensions typical of an automobile-sized brake shoe the initial cross-linking/stabilising phase undertaken in the stabilising press using a preheated shoe platform has a duration of about 1 minute, including loading and unloading, and the free baking of the dimensionally stabilised product can take less than 40 minutes, possibly significantly less.

It is to be expected that friction elements having larger sizes of lining, and considerably larger metal shoes with greater thermal mass, require changes in durations and pressures, and possibly temperatures, to control the cross-linking reactions, of gases trapped further from venting surfaces can be expelled properly and achieve a uniform density of lining and heat for cross-linking can penetrate to all parts of the lining sheet but to be in principle as described above.

The above described manufacturing process is intended to, and does, make use of formulations and forms known in the art for the manufacture of friction lining material and the behaviour of the constituent elements in response to temperature and pressure is generally well known. Accordingly it is within the purview of a practitioner in the art to determine appropriate levels of temperature, pressure and time intervals for any precise formulation and dimensions and properties required of the lining resulting from curing the element. In particular it describes the use of materials which themselves, and as a result of the admixing and rolling into plastic form, have trapped gases and/or volatile materials and/or take part in chemical reactions (typically, but not necessarily, condensation reactions) during curing which gives rise to such gases, and for which the ability to vent such gases is essential. It will be appreciated however that the resin binder material may have a composition which cures without significant evolution of gases, but the method and apparatus as described above may still be employed.

The various parameters and typical ranges of values referred to above may be put into context by reference to the following Example.

EXAMPLE

A brake shoe for an 8 inch drum brake of a 2 liter engine size/1 tonne class of passenger automobile comprises a mild steel shoe body having a platform of 200 mm×38 mm×2 mm, and a web thickness of approximately 3.5 mm, cylindrically curved with a nominal 4 inch radius of curvature. A shoe body, of weight 275 grammes, had its platform cleaned and coated with a thin layer of the aforementioned IR 1947 primer sold commercially for this purpose, the primer coating being air-dried at ambient temperature.

A green friction material was prepared by mixing the ingredients referred to above and rolling into a plastic sheet to a thickness of 4.5 mm. The sheet was cut to provide an individual lining element having major faces measuring 135 mm×35 mm. The lining element was curled by passing between rollers to have a nominal 4 inch radius of curvature (corresponding to the shoe platform) and coated on its concave major face with a 0.9 grammes wet weight of the aforementioned PL605-35, representing the main component of the adhesive system, which was allowed to dry in air.

Having prepared the shoe, with its minor component of the adhesive system and the green lining element with its major component of the adhesive system, a pre-heating oven large enough to accommodate the shoe was heated to a temperature of 275° C. and the stabilising press pre-heated to a bed temperature of 230° C.

The primed shoe was placed in the pre-heating oven to increase its thermal energy, and in the process initiating cross-linking of the primer, achieving a surface temperature of about 209° C. after 8 minutes, the time-temperature combination being such that the primer was not fully cross-linked before removing the shoe from the pre-heating oven.

Immediately before the shoe was removed from the pre-heating oven the bed of the stabilising press was sprayed with a mould release agent, such as MARBOCOTE W414 or MARBOCOTE 75CEE produced by Marbo Italia SpA, and the lining element disposed on the heated press-bed with the concave, adhesive-coated face exposed. The shoe was extracted from the pre-heating oven at the end of the 8 minutes pre-heating time and immediately (within 15 seconds handling time) disposed between the guidance plates of the press with its convex, primed surface against the adhesive-coated surface of the lining element.

The control means was operated to supply air to the pneumatic ram means, initially to move the ram interface into contact with concave surface of the platform, followed by the timed consecutive consolidating and setting-up intervals. The control means was set to increase the supply pressure to the ram means linearly with time for 5 seconds representing the consolidating interval, the pressure being such as to exert a force on the shoe increasing from 0 to 445 Newtons (100 pounds force), being equivalent to a pressure on the element of 93.8 kN/m$^2$ (13.6 psi) of lining area. At the end of said 5 second consolidating interval the ram means was mechanically clamped and locked in position for a further 45 seconds setting-up interval, at the end of which the ram means and interface were retracted away from the shoe of the now-bonded intermediate product.

The bonded intermediate product was removed from the press and exhibited an elevated temperature of about 150° C. It was placed into a baking oven held at a temperature in the range 240–300° C. where it was baked without further constraint for 20–40 minutes to achieve the desired degree of friction lining hardness.

The shoe with its bonded lining was removed from the oven means and allowed to cool. The lining was found to have reduced in thickness to some 4 mm, a reduction of about 8% and increased in density also by some 8%, the major face dimensions being substantially unchanged because of low-extrusion pressures during the consolidation interval. The bonded brake shoe was tested to destruction in respect of the shear strength of the bond in accordance with BS AU 180: Part 3: 1982 and found to have a failure pattern of 6 or 7, that is, the friction material sheared within itself before the bond with the shoe platform.

In addition to process variations, it will be appreciated that variations may also be made as to the adhesive system, both to the type or types of materials and possibly the number of components. For example, the platform surface may be devoid of any adhesive component acting as a primer and be cleaned immediately prior to pre-heating so that the only component of the adhesive system is that applied to the lining element. Alternatively, the adhesive system may comprise one or more components applied to the platform of the shoe before and/or after the pre-heating operation and none applied to the green lining element before entering the stabilising press.

In suitable circumstances the separate adhesive resin components may be omitted altogether such that the resin binder of the lining element present at the surface of the element acts as such adhesive and becomes bonded to the surface of the platform as it cures within the stabilising press.

It will be seen from FIG. 5 that the modest pressure exerted on the lining element at the end of the consolidating interval and any increase in the setting-up interval resulting from the behaviour of the materials at the elevated press temperature causes the major face 17 of the lining and adhesive to conform with the shoe platform 12, including following any surface variations, such as depressions 14 that result from shoe construction. It will be understood that if desired, such platform could have a plurality of surface features, recessed or raised in the form of discrete recesses or bumps or in the form of transversely extensive troughs or ribs, with which the surface of the element and adhesive would conform to offer a subsidiary mechanical interlock to improve shear strength along the shoe in operation.

It will be appreciated that the extremely low consolidating pressure applied to the stabilising press is likely to be insufficient to effect significant redistribution of the material of the lining element. For example, if the press bed and closure member have radii of curvature that result in the recess floor and shoe platform respectively being other than parallel, and the green lining element is of uniform thickness, then the pressure is unlikely to permit more than a minor deviation in curvature of the major faces of the element by the press. However, the consolidating pressure itself, or a pre-consolidation or shaping pressure, may be applied by the ram means to enable the shoe platform to bend a substantially flat but plastic green lining element, supported at individual points by the arcuate bed, into conformity with the bed and platform prior to application of the consolidating pressure.

It will also be appreciated that the structure of the stabilising press may be varied from that described above whilst performing the same function. For example the bed of the press may be shaped to support the shoe body with the platform facing the ram means and for a closure member of conforming shape and recessed to bear against a lining element sandwiched between it and the shoe platform. The bed of the stabilising press may be formed other than by combination of shoulder and guidance plates and an intervening spacer block. For instance, the recessed floor of the press bed may be formed integrally with the both guidance plates as one unitary structure, or integrally with one or both of separate guidance plates. Furthermore, the guidance plates and/or separate spacer block may be separable from each other to facilitate removal of a bonded intermediate product other than upwardly.

Figure 6:
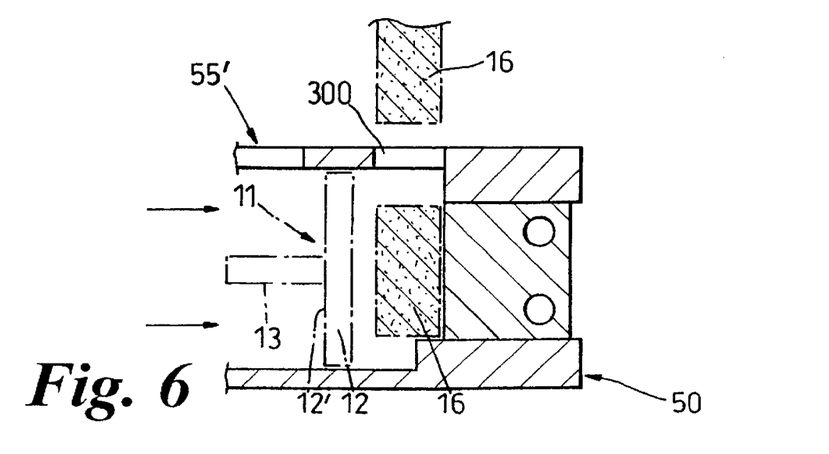
FIG. 6 is a sectional elevation, similar to FIG. 3(b) of an alternative arrangement of stabilising press in which the lining element is introduced laterally with respect to the shoe platform.

Alternatively, and as illustrated in FIG. 6, the guidance means 55' may include at least one aperture 300 to permit the lining element 16 and possibly the shoe body 11, to be loaded laterally with respect to the reciprocation direction of the ram means, this would facilitate reciprocation of the ram means in a horizontal plane and/or the bonded intermediate component to be removed along a different path from which its constituted parts are supplied.

In all of the above described embodiments the non-sealing enclosure of the stabilising press is achieved by virtue of the non-sealing relationship between the shoe body 11, effecting a non-sealing closure member, and the guidance plates, such arrangement permitting the major faces of the lining element to be fully and uniformly supported whilst gaseous components vent by way of the minor faces. It will be appreciated that if desired the press may take a form whereby the closure member (shoe platform) and/or press bed is provided with an array of very small, pin-hole venting through-apertures that permit such gases to escape through the major surfaces, but with the surfaces well supported around each such aperture and the disruption at each aperture insufficient to deleteriously effect the uniformity of the cured lining, the bond to the shoe platform or its removal from the press.

It will be appreciated that although it is convenient to load and unload the stabilising press manually, the relatively simple operations may be performed by mechanical manipulation means, coordinated with, or under the control of, the control means 90. In particular such manipulation could be associated with automatically ejecting reject intermediate products from the process and preventing their reaching the oven means 100. Other variations are possible, For example, the ram means may comprise a mechanical lead screw arrangement or a hydraulic piston and cylinder arrangement; in the latter case the locking means may operate by providing a hydraulic lock and the reaction pressure measured by way of monitoring pressures or pressure differentials within the hydraulic lock. Similarly, the thermal barrier means may comprise all or some of the piston rod 73 or of the ram interface 75 being formed of material having poor thermal conductivity. The ram interface may also differ by acting on the shoe body web 13 instead of, or in addition to, acting directly on the platform.

As indicated above, and re-iterated here for completeness, the above described processes and variants are applicable to shoes for different sizes of brakes and insofar as the dimensions quoted in some detail relate specifically to automobile-sized brakes as herein defined, the processes and apparatus are suitable for brakes having such approximate dimensions that find use in other vehicles and machines, such as the aforementioned static, or parking, brakes of commercial vehicles that required much larger dimensioned dynamic, or service, brakes.

Whereas the above descriptions have concentrated on the production of a friction element that is a an arcuate brake shoe of which the friction lining is intended to bear against a cylindrical brake drum, it may also be employed with modification only to the shape of the bed to manufacture a substantially flat element, such as a disc brake pad.

It will be appreciated that although the closure member of the stabilising press is one part of the bonded intermediate product produced by the press, this need not be so and a separable closure member, possibly also recessed like the bed, may be employed; such an arrangement would have specific use in bonding lining elements to both faces of carrier disposed between them in the press, for example a clutch plate.

What is claimed is:

1. A method of manufacturing a bonded friction element comprising (1) producing a plastic friction lining element, including fibrous reinforcement and friction modifying materials in a matrix of an uncured thermosetting resin binder disposed between opposite major faces defining its thickness, (2) disposing one of the two major faces of the lining element adjacent a platform of a carrier with a thermosetting resin adhesive system between, and in contact with, the element and the platform, and (3) curing the resins of both adhesive system and lining element by cross-linking at elevated temperature to a degree of cure whereby the element forms a lining bonded to the platform, the method being characterised by (4) preparing the surface of the carrier platform to receive said thermosetting adhesive system, (5) preheating the carrier to a platform temperature in excess of that required to initiate cross-linking of said adhesive system, (6) sandwiching the lining element and adhesive system between the pre-heated platform and a bed of a stabilising press preheated to a temperature in excess of that required to cross-link the lining element binder and adhesive system, said bed being shaped to conform substantially to the platform and further recessed to receive within said recess the lining element with the opposite major face bearing against the floor thereof, (7) applying to the sandwiched element and adhesive system by way of the platform and bed a consolidating pressure increasing over a predetermined consolidating interval from substantially zero to a predetermined level, permitting plastic flow of the adhesive system and element into conformity with the platform and recess but without significant extrusion before onset of cross-linking of the thermosetting resins, and thereafter maintaining the separation between platform and bed achieved at the end of the consolidating interval for a setting-up interval to permit cross-linking adjacent the heated surfaces to define a stably bonded intermediate product including a partially cured, dimensionally stabilised lining element having substantially the final dimensions and density of the lining, (8) removing the bonded intermediate product from the stabilising press and (9) baking the intermediate product unconstrained at a predetermined baking temperature and for a baking interval to effect further curing of the thermosetting resin of the dimensionally defined lining element to a predetermined level of hardness and strength.

2. A method as claimed in claim 1 including depositing said adhesive system on the surface of at least one of the opposite major faces of the lining element and the platform of the carrier and prior to disposing in the stabilising press.

3. A method as claimed in claim 2 including depositing said adhesive system as a first component on said one major face of the lining element and a second component on said platform of the carrier and preheating the carrier platform with said adhesive component thereon to a temperature above that at which cross-linking of the second adhesive component is initiated but for a time that is insufficient for complete cross-linking of the thermosetting adhesive component.

4. A method as claimed in claim 3 including depositing on the platform of the carrier a said primer component of the thermosetting adhesive system having a cross-linking temperature in excess of 180° C. and pre-heating said primed platform for between 2 and 14 minutes to a temperature in the range 200° C.–210° C. immediately prior to sandwiching the adhesive system and lining element between the platform of the carrier and bed of the stabilising press.

5. A method as claimed in claim 1 including depositing as components on said lining element, and on said platform as a primer, a thermosetting phenolic resin adhesive.

6. A method as claimed in claim 1 including maintaining the bed of the stabilising press at a temperature in the range 210° C. to 250° C.

7. A method as claimed in claim 1 including increasing said consolidating pressure to said predetermined level in the range 35–150 kN/m² (5–21.75 psi) over a consolidating interval in the range 4–6 seconds.

8. A method as claimed in claim 7 including maintaining the separation between platform and bed achieved at the end of the consolidating interval for a setting-up interval of in the range 40–60 seconds.

9. A method as claimed in claim 1 including monitoring the pressure within the lining element in the press sandwiched between platform and press bed throughout the consolidating and setting-up intervals and determining when the monitored lining element pressure has reached a stable predetermined low value to indicate an end of the setting-up interval.

10. A method as claimed in claim 9 including (a) storing parameters relating to suitable pressure values within the lining element as a function of time through the consolidating and setting-up intervals that are known to result in a friction lining having desired physical properties, (b) monitoring the pressure exerted on the lining element during the consolidating interval and reaction pressure exerted by the lining element during the setting up interval, (c) comparing the monitored and stored values and, (d) providing, in response to a predetermined degree of deviation between the values, an indication that the bonded intermediate product is unsatisfactory and a reject.

11. A method as claimed in claim 1 including baking the bonded intermediate product at a temperature in the range 240–300° C. for a baking interval in the range 20–40 minutes.

12. A method as claimed in claim 1 including producing said plastic friction lining element having a density in the range of 80% to 95% of the density required of the lining and a volume correspondingly greater than required of the lining.

13. A method as claimed in claim 1 including producing said plastic friction lining element by rolling to effect said major faces by contact with rolling surfaces and applying said component of the adhesive system to the said major face of the lining element by moving said lining element face relative to a roller and disposing said component between the face and the roller.

14. An arrangement for producing a bonded friction element of the type having one major face of a thermoset friction lining secured to a platform of a carrier by a thermosetting adhesive system, the arrangement comprising a) formulating means, operable to produce a green, plastic friction lining element, comprising fibrous reinforcement and friction modifying materials in a matrix of uncured thermosetting resin binder between said one major face of the element and an opposite major face defining its thickness, of lesser density and major face dimensions than required of the final lining, and characterised by b) platform preheating means operable to heat a said carrier to a temperature in excess of that required to initiate cross-linking of the resin binder of the element and the adhesive system, c) a stabilising press including
   1) a bed, shaped to conform substantially to the carrier platform, containing a recess dimensioned to receive therein said green, plastic lining element with said opposite major face thereof against the floor of the recess and said one major face thereof without the recess,
   2) heating means, operable to heat the bed to provide a recess floor temperature above the cross-linking temperature of the lining element binder,
   3) a non-sealing closure member operably defined by a said heated carrier,
   4) guidance means extending away from the bed and operable to support said closure member overlying the recess and effect guidance between the closure member and the recess in a direction towards and away from the recess,
   5) ram means, having relatively displaceable parts fixed and movable respectively with respect to the bed, operable to drive the closure member (11) and bed (51) towards each other,
   6) locking means operable to retain the closure member in position with respect to the bed, and
   7) control means operable
      (i) to cause the ram means to move the closure member to sandwich the green, plastic friction lining element and adhesive system between the closure member and the recess floor,
      (ii) to cause the ram means to apply a force between the closure member and bed increasing between predetermined levels in a predetermined consolidating interval, sufficient to force the incompletely cross-linked materials of the adhesive system and lining element into conformity with the platform and recess without significant extrusion of unconfined materials, prior to significant cross-linking of the thermosetting resins thereof due to heat and pressure applied to their surface regions,
      (iii) to initiate operation of the locking means to lock the closure member in position with respect to the bed at the end of said consolidating interval for a setting-up interval in which said surface regions achieve by continued cross-linking structural strength in excess of internally generated forces resulting from subsequent cross-linking and heating, and
      (iv) to initiate release of the locking means at the end of said setting-up interval to permit the bonded intermediate product of platform and partially cured friction lining element to be removed from the press, and d) oven means operable to receive said bonded intermediate product unconfined at a predetermined baking temperature for a predetermined baking interval to effect additional cross-linking of the thermosetting components thereof to cure the friction lining and adhesive bond to a predefined condition of hardness and physical strength.

15. An arrangement as claimed in claim 14 in which the formulating means for producing the plastic friction lining element includes coating means operable to dispose a layer of an uncured component of the adhesive system onto said one major face of the green, plastic lining element.

16. An arrangement as claimed in claim 14 in which the stabilising press comprises a pair of metal guidance plates, spaced apart by the width of the carrier platform such that the platform can slide between facing surfaces thereof defining said guidance means, and each having a shoulder, extending from a said facing surface towards the facing plate, defining the bed of the press surrounding the recess and, between said shoulders, a metal floor of the recess.

17. An arrangement as claimed in claim 16 including a metal spacing block disposed between said guidance plates said spacing block providing the floor of the recess.

18. An arrangement as claimed in claim 16 for producing a brake shoe having a carrier including a substantially part-cylindrical platform and friction lining element wherein said plates of the guidance means have arcuate shoulders with a curvature corresponding to the platform and the recess floor has a corresponding arcuate surface.

19. An arrangement as claimed in claim 16 in which characterised in that said recess floor comprises raised portions spaced apart in a direction parallel to the planes of the plates and defining the ends of the recess substantially coplanar with said shoulders.

20. An arrangement as claimed in claim 19 in which the ram means comprises a piston and cylinder arrangement and a source of pressurised fluid for the cylinder responsive to the control means to displace the piston with respect to the cylinder and arranged to exert a pressure on the closure member of less than 150 kN/m$^2$ (21.75 psi).

21. An arrangement as claimed in claim 14 in which the control means is (a) operable to store parameters relating to suitable pressure values within the lining element as a function of time through the consolidating and setting-up intervals that are known to result in a friction lining having desired physical properties, (b) operable to monitor the pressure exerted on the lining element during the consolidating interval and reaction pressure exerted by the lining element during the setting up interval, (c) operable to compare the monitored and stored values and, (d) operable, in response to a predetermined degree of deviation between the values, to provide an indication that the bonded intermediate product is unsatisfactory and a reject.

22. An arrangement as claimed in claim 21 in which the control means includes load cell means operable to provide signals representative of the instantaneous load exerted on the actuated locking means by the reaction pressure from the lining element.

23. An arrangement as claimed in claim 21 in which the control means is responsive to a said indication to effect ejection of a reject intermediate product from the manufacture prior to receipt by said oven means.

24. An arrangement as claimed in claim 14 in which at least one of the platform pre-heating means and the oven means comprises a continuous oven having an inlet region, operable to receive said platform or bonded intermediate product respectively, transport means operable to transport it through the oven in a predetermined time interval and to discharge it therefrom by way of an outlet region.

* * * * *